United States Patent
Hazlebeck et al.

(10) Patent No.: US 7,611,625 B2
(45) Date of Patent: Nov. 3, 2009

(54) WATER OXIDIZATION SYSTEM

(75) Inventors: David A. Hazlebeck, El Cajon, CA (US); John L. Perlman, San Diego, CA (US)

(73) Assignee: General Atomics, San Diego, CA (US)

( * ) Notice: Subject to any disclaimer, the term of this patent is extended or adjusted under 35 U.S.C. 154(b) by 353 days.

(21) Appl. No.: 11/279,522

(22) Filed: Apr. 12, 2006

(65) Prior Publication Data

US 2009/0223887 A1 Sep. 10, 2009

(51) Int. Cl.
*C02F 1/72* (2006.01)

(52) U.S. Cl. .................. 210/179; 210/181; 210/205; 422/184.1; 422/194; 422/207; 422/224

(58) Field of Classification Search ............... 210/761
See application file for complete search history.

(56) References Cited

U.S. PATENT DOCUMENTS

| | | | |
|---|---|---|---|
| 2,944,396 A | 7/1960 | Barton et al. | |
| 3,207,572 A | 9/1965 | Saul | |
| 3,761,409 A | 9/1973 | McCoy et al. | |
| 3,876,536 A | 4/1975 | Pradt et al. | |
| 3,920,506 A | 11/1975 | Morgan | |
| 3,984,311 A | 10/1976 | Diesen et al. | |
| 4,013,560 A | 3/1977 | Pradt | |
| 4,061,566 A | 12/1977 | Modell | |
| 4,100,730 A | 7/1978 | Pradt | |
| 4,141,829 A | 2/1979 | Thiel et al. | |
| 4,155,848 A | 5/1979 | Sato et al. | |
| 4,229,296 A * | 10/1980 | Wheaton et al. | 210/758 |
| 4,264,844 A * | 4/1981 | Axe et al. | 315/111.01 |
| 4,288,406 A | 9/1981 | Sims, Jr. | |
| 4,338,199 A | 7/1982 | Modell | |
| 4,380,960 A | 4/1983 | Dickenson | |
| 4,543,190 A | 9/1985 | Modell | |
| 4,594,164 A | 6/1986 | Titmas | |
| 4,792,408 A | 12/1988 | Titmas | |
| 4,822,497 A * | 4/1989 | Hong et al. | 210/721 |
| 4,861,497 A * | 8/1989 | Welch et al. | 210/759 |
| 4,960,571 A * | 10/1990 | Bhagat et al. | 422/194 |
| 5,100,560 A | 3/1992 | Huang | |
| 5,106,513 A | 4/1992 | Hong | |

(Continued)

OTHER PUBLICATIONS

Smith, John, Supercritical Deep Well Oxidation A Low Cost Final Solution, Oxidyne Corporation, Dallas, TX.

(Continued)

*Primary Examiner*—Peter A Hruskoci
(74) *Attorney, Agent, or Firm*—Nydegger & Associates

(57) ABSTRACT

A system and method for oxidizing a feed material includes a reactor vessel that forms an enclosed chamber. The vessel includes a port for introducing the feed material into the chamber where it can be oxidized to create salts and particulates, together with a fluid effluent. After their creation, the salts and particulates flow into a brine pool maintained within the chamber. Thereafter, brine, including salts and particulates, can be removed from the chamber through a vessel outlet. Further, the vessel includes a fluid effluent discharge pipe extending from outside the vessel, through the brine pool, into the chamber. As a result of this structure, the fluid effluent can be separated from the salts and particulates and discharged from the chamber through the pipe, passing through the brine pool.

11 Claims, 1 Drawing Sheet

U.S. PATENT DOCUMENTS

| | | | |
|---|---|---|---|
| 5,200,093 A | 4/1993 | Barner et al. | |
| 5,232,604 A | 8/1993 | Swallow et al. | |
| 5,545,337 A * | 8/1996 | Hong | 210/761 |
| 5,552,039 A * | 9/1996 | McBrayer et al. | 210/90 |
| 5,558,783 A * | 9/1996 | McGuinness | 210/761 |
| 6,051,145 A | 4/2000 | Griffith et al. | |
| 6,214,222 B1 * | 4/2001 | Gerber | 210/199 |
| 6,238,568 B1 | 5/2001 | Hazlebeck | |
| 6,773,581 B2 * | 8/2004 | Hazlebeck et al. | 210/178 |

OTHER PUBLICATIONS

Smith, John, Supercritical Deep Well Oxidation A Low Cost Final Solution, Oxidyne Corporation, Dallas, TX.

* cited by examiner

WATER OXIDIZATION SYSTEM

The U.S. Government has a paid-up license in this invention and the right in limited circumstances to require the patent owner to license others on reasonable terms as provided for by the terms of Contract No. F08630-02-C-0083 awarded by the Air Force Armament Center.

FIELD OF THE INVENTION

The present invention pertains generally to methods and systems for water oxidation of material for the purposes of waste destruction, energy generation, or production of chemicals. More specifically, the present invention pertains to methods and systems for water oxidation of organics that contain or generate inorganic compounds such as salts or oxides, or other particulates. The present invention is particularly, but not exclusively, useful as a method and system for separating the salts and particulates from the fluid effluent generated during oxidation to facilitate energy recovery from the fluid effluent.

BACKGROUND OF THE INVENTION

As set forth in U.S. Pat. No. 6,054,057, which is herein incorporated by reference, the process of wet oxidization involves the addition of an oxidizing agent, typically air or oxygen, to an aqueous stream including feed materials at elevated temperatures and pressures. The resultant "combustion" of organic or inorganic oxidizable feed materials occurs directly within the aqueous phase.

For supercritical water oxidation ("SCWO"), oxidization occurs essentially entirely at conditions which are supercritical in both temperature (>374° C.) and pressure (>about 3,200 psi or 220 bar). Importantly, SCWO has been shown to give rapid and complete oxidation of virtually any organic compound in a matter of seconds at five hundred degrees Celsius to six hundred fifty degrees Celsius (500° C.-650° C.) and 250 bar. During this oxidization, carbon and hydrogen in the oxidized material form the conventional combustion products carbon dioxide ("$CO_2$") and water. When chlorinated hydrocarbons are involved, they give rise to hydrochloric acid ("HCl"), which will react with available cations to form chloride salts. Due to the adverse effects of HCl, alkali may be intentionally added to the reactor to avoid high, corrosive concentrations of hydrochloric acid in the reactor and especially in the cooldown equipment following the reactor. When sulfur oxidation is involved, the final product in SCWO is a sulfate anion. This is in contrast to normal combustion, which forms gaseous sulfur dioxide ("$SO_2$"). As in the case of chloride, alkali may be intentionally added to avoid high concentrations of sulfuric acid. Similarly, the product of phosphorus oxidation is phosphate anion.

At typical SCWO reactor conditions, densities are in the range of 0.1 g/cc, so water molecules are considerably farther apart than they are in ambient liquid water. Hydrogen bonding, a short-range phenomenon, is almost entirely disrupted, and the water molecules lose the ordering responsible for many of liquid water's characteristic properties. In particular, solubility behavior is closer to that of high pressure steam than to liquid water. Smaller polar and nonpolar organic compounds, with relatively high volatility, will exist as vapors at typical SCWO conditions, and hence will be completely miscible with supercritical water. Gases such as $N_2$, $O_2$, and $CO_2$ show similar complete miscibility. Larger organic compounds and polymers will hydrolyze to smaller molecules at typical SCWO conditions, thus resulting in solubilization via chemical reaction. The loss of bulk polarity by the water phase has striking effects on normally water-soluble salts, as well. In particular, because they are no longer readily solvated by water molecules, salts frequently precipitate out as solids that can deposit on process surfaces and cause fouling of heat transfer surfaces or blockage of the process flow.

This precipitation of solids presents a significant problem in industrial uses of SCWO applications. Specifically, one of the key issues that must be addressed in SCWO applications is the energy cost of compressing air for use in the feed material. In order to reduce energy costs, efforts have been made to recover energy from the reactor stream. However, the large quantities of salts and particulates in the reactor stream interfere with the energy recovery devices. Various systems have been proposed to overcome such interference. For instance, some systems have utilized a filter or cyclone device downstream of the reactor to separate the salts and particulates from the stream before energy recovery. However, the salts and particulates often plug the flow of the stream at the reactor. Therefore, the flow must first be quenched to a low enough temperature to form an aqueous phase. Quenching the reactor stream lowers its temperature and reduces the net energy that can be recovered therefrom.

In order to avoid the reduction of recoverable energy, a reversing flow reactor was developed. In such a reactor the flow enters and exits at the top, while a brine pool is maintained at the reactor bottom. While this design addresses the energy recovery issue, it limits the reaction zone to 3-4 L/D before the fluid reverses. Further, it limits the conditions in the reaction zone to a back-mixed zone. As a result, achieving high destruction efficiency in such a reactor requires a large diameter vessel with a high capital cost.

In light of the above, it is an object of the present invention to provide a system and method that provides for separation of the fluid effluent from the salts and particulates resulting from oxidization. Another object of the present invention is to provide a system and method that provides a fluid effluent substantially free of salts and particulates while retaining a high destruction efficiency. Still another object of the present invention is to provide a system and method which allows recovery of energy from the high temperature, high pressure fluid effluent. Yet another object of the present invention is to provide a system and method which is easy to implement, simple to use, and cost effective.

SUMMARY OF THE INVENTION

In accordance with the present invention, a system oxidizes a feed material under conditions wherein the temperature is within a range from above approximately 374° C. to approximately 800° C. and the pressure is above approximately 25 bar. Structurally, the system includes a hollow, generally cylindrical-shaped reactor vessel that creates an enclosed chamber. At its top end, the vessel includes a port to allow the feed material to be introduced into the chamber. In the chamber, the feed material is oxidized to create a fluid effluent together with salts and particulates. The vessel further includes a brine pool at its bottom end for collecting salts and particulates that result from the reaction of the feed material.

For the present invention, the vessel includes an inlet in fluid communication with the brine pool for maintenance thereof. Specifically, the inlet provides for the introduction of a quench fluid to the chamber to maintain the brine pool. Further, the bottom end of the vessel includes an outlet in fluid communication with the brine pool to allow selective removal of salts and particulates from the chamber. Likewise, a discharge pipe is provided for removal of the fluid effluent from the chamber. Structurally, the discharge pipe is affixed to the bottom end of the vessel and is oriented to extend through and beyond the brine pool. As a result, the internal end of the discharge pipe is positioned inside the chamber and above the brine pool while the external end of the discharge pipe is positioned outside the chamber.

During the operation of the system of the present invention, the feed material is introduced into the chamber through the port. Preferably, the feed material, including at least one reactant and water, is forced into the chamber by a jet assembly. The jet assembly jet mixes the feed material in the section of the chamber proximate the top end of the vessel, i.e., the back-mixing section. Due to the jet mixing, reaction of the feed material is initiated. As the feed material moves downward, additional reaction occurs in the section positioned between the back-mixing section and the brine pool, i.e., the plug flow section.

As a result of the reaction of the feed material, high temperature, high pressure fluid effluent is formed in the chamber along with salts and particulates. Due to gravitational forces, the salts and particulates flow downward into the brine pool. In order to maintain the brine pool as it accumulates salts and particulates, a quench fluid is selectively introduced into the pool through the inlet. Further, brine, and the salts and particulates it holds, is removed from the chamber through the outlet at the bottom of the vessel. In this manner, the salts and particulates are separated and removed from the fluid effluent. The relatively clean fluid effluent can be removed from the chamber through the discharge pipe passing through the brine pool. Because the fluid effluent exits the chamber through the brine pool, the system is able to facilitate reactions through the back-mixing and plug flow sections. After removal of the fluid effluent from the vessel, heat and/or energy can be removed therefrom by appropriate recovery units without complications due to salts and particulates.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
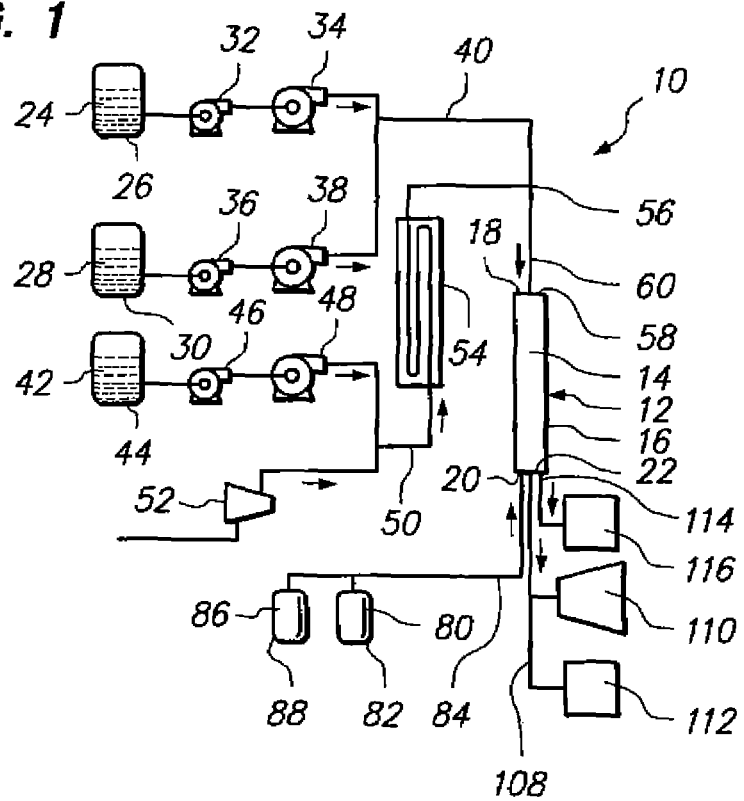
FIG. 1 is a schematic diagram of the components of a system in accordance with the present invention.

Referring initially to FIG. 1, a system in accordance with the present invention is shown schematically and is generally designated 10. As shown, the system 10 includes a hollow, generally cylindrical-shaped reactor vessel 12 that encloses a reactor chamber 14 with side walls 16. It is also shown that the reactor vessel 12 has ends 18 and 20. Preferably, the reactor vessel 12 is substantially vertically oriented with the top end 18 directly above the bottom end 20 so that gravitational forces will act to draw the combustible material through the reactor chamber 14. It is to be appreciated, however, that the vessel 12 can be oriented other than vertically, as long as an exit section 22 is below the reaction zone to avoid density instabilities. Further, it should be ensured that excessive solids do not fall onto and accumulate on the side walls 16. Regardless of the particular orientation, the important factor, which is more fully set forth below, is that there be a substantially unidirectional flow of material through the vessel 12.

The feed material to reactor vessel 12 of the system 10 can, in certain embodiments, include four separate identifiable constituents. These are: (1) the reactant to be processed; (2) an auxiliary fuel, if necessary to sustain reaction in the reactor chamber 14; (3) water; and (4) a pressurized oxidant. More specifically, FIG. 1 shows that the reactant 24 which is to be processed is initially held in a holding tank 26. As contemplated for the present invention, the reactant 24 can consist of organic material, inorganics, particulates, sludge, soil, neutralizing agents, salt-forming agents, minerals, and/or combustible material. As indicated in FIG. 1, it may be necessary to combine this reactant 24 with an auxiliary fuel 28, such as ethanol, which can be initially held in a holding tank 30.

FIG. 1 also shows that both the reactant 24 and the auxiliary fuel 28, if used, are pressurized before being introduced into the reactor chamber 14. Specifically, a transfer pump 32 and high pressure pump 34 are used to pressurize the reactant 24. Similarly, a transfer pump 36 and a high pressure pump 38 are used to pressurize the auxiliary fuel 28. As shown for the schematic of system 10 in FIG. 1, the pressurized reactant 24 and auxiliary fuel 28 are combined in line 40 and transferred to the top end 18 of the reactor chamber 14. It is to be noted that while the reactant 24 and auxiliary fuel 28 are respectively pressurized by high pressure pumps 34 and 38 to pressures above about 220 bar, they are not necessarily raised in temperature prior to being introduced into the reactor chamber 14. Thus, as intended for the system 10, the reactant 24 can be introduced into the reactor chamber 14 at ambient temperatures.

In addition to the reactant 24 and auxiliary fuel 28, the feed material to reactor chamber 14 can also include pressurized water 42 and a pressurized oxidant. As shown in FIG. 1, water 42 is drawn from holding tank 44 by transfer pump 46 and is thereafter pressurized by high pressure pump 48 before it is passed into line 50. At the same time, air, or some other oxidant, is pressurized by a compressor 52 and is passed into the line 50. For purposes of the present invention, the oxidant to be used, as an alternative to air, can be pure liquid or gaseous oxygen, enriched air, hydrogen peroxide, nitric acid, nitrous acid, nitrate, and nitrite. Alternatively, a substoichiometric oxidant can be used for applications in which partial oxidization of the reactant 24 is desired. In any event, at this point the pressurized water 42 and compressed air (oxidant) are mixed and introduced into a preheater 54. As contemplated by the present invention, the heating of the pressurized water/air mixture in preheater 54 can be accomplished in several ways. For example, a regenerative heat exchange with hot effluent from reactor chamber 14 can be used. Alternatively, an external source, such as electricity, or a fired heater, or a combination of these, can be used. For a cold startup of the system 10, external heat sources must be used. When using a reactant 24 that has sufficient inherent heating value by itself, the preheater 54 may be shut down once a steady state operation of the system 10 has been achieved.

As the air/water mixture leaves the preheater 54, it is mixed with the reactant 24 and auxiliary fuel 28 from the line 40. This mixing occurs at the junction 56, and the feed material, including the combination of reactant 24, auxiliary fuel 28, water 42, and compressed air (oxidant) is then introduced into the reactor chamber 14 via a port 58. As will be appreciated by the skilled artisan, an alternative for the system 10 is to use separate feed lines for introducing one or more of the streams which make up the feed material into the reactor chamber 14 through the port 58. If so, one feed line could be used for the introduction of the reactant 24 and auxiliary fuel 28, and another feed line would be used for the introduction of water 42 and oxidant. Similarly, a separate feed line could be used for the reactant 24, the auxiliary fuel 28, the water 42, and the oxidant. Further, depending upon the particular reactant 24, it may be important to use a high shear mixer at the junction 56 to mix the feed/fuel stream from line 40 with the water/oxidant stream from the preheater 54. For example, if the reactant 24 is largely water insoluble, high shear mixing is desirable to ensure sufficient mixing of combustible materials and high pressure oxidant.

Figure 2:
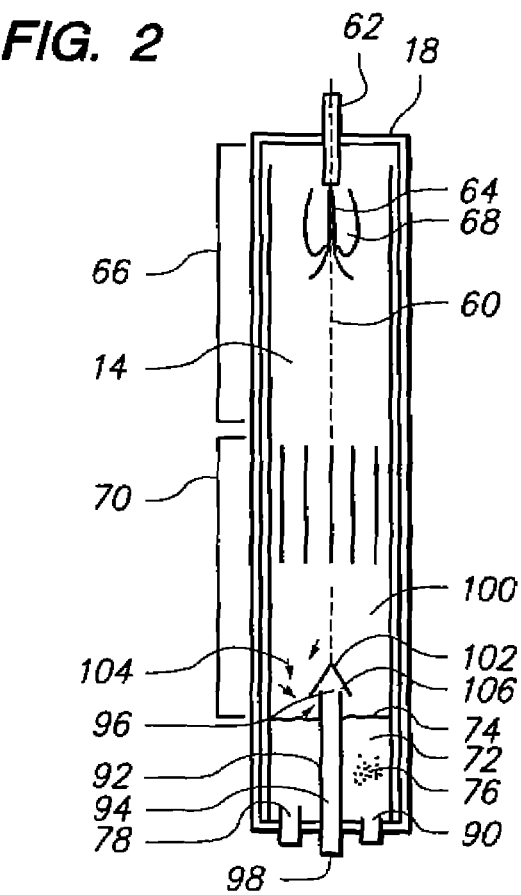
FIG. 2 is a schematic cross-sectional representation of a reactor for the present invention, showing flow characteristics within the reactor.

Referring now to FIG. 2, it will be seen that the vessel 12 and chamber 14 generally define a longitudinal axis 60. For purposes of the present invention, it is preferable that this longitudinal axis 60 of the vessel 12 be vertically oriented with the top end 18 directly above the bottom end 20 so that gravitational forces act generally downwardly along the axis 60 on the feed material. With this orientation, all of the feed material that is to be introduced into the reactor chamber 14 through the port 58 is passed through a jet assembly including a nozzle 62. Importantly, the nozzle 62 introduces a stream of material 64 into the reactor chamber 14 of the vessel 12 in a direction which is substantially along the axis 60. In one embodiment, the nozzle 62 can introduce a straight single jet of the stream 64 at a velocity of about fifty feet per second (50 fps). In another embodiment, the nozzle 62 can consist of a plurality of nozzles 62 with their respective streams 64 introduced as jets which are inclined toward the axis 60. With this inclination, the streams 64 are directed slightly toward each other for collision with each other.

Importantly, the feed material from nozzle 62 should be directed so as not to directly impinge on the walls 16 of the reactor chamber 14. In this way, build up of solid materials on the walls 16 of the reactor chamber 14 can be minimized. As shown in FIG. 2, the reaction stream 64 is introduced into the upper portion of the reactor chamber 14 where it is subjected to vigorous back-mixing. Specifically, fluid flow in this back-mixing section 66 is characterized by a turbulence in the reaction stream 64 that results from entraining shear forces and eddies 68 which are set up as the feed material enters into the reactor chamber 14. The feed material is thus rapidly brought above the supercritical temperature of three hundred seventy-four degrees Celsius (374° C.) and rapid reaction commences. Further, while the present system 10 avoids direct impingement of the reaction stream 64 onto the walls 16, heat transfer from the walls 16 in the back-mixing section 66 can assist in the propagation of the reaction within the vessel 12.

Below the back-mixing section 66 in reactor chamber 14 is a plug flow section 70. This plug flow section 70 is characterized by the fact that there is no large scale back-mixing of the reaction stream 64 in this lower portion of the reactor chamber 14. The flow of the reaction stream 64 in the plug flow section 70, however, does exhibit local turbulent mixing.

The present system 10 also includes a pool of brine 72 having a surface level 74 below the plug flow section 70. The brine 72 captures the salts and particulates 76 that tend to flow down the side walls 16 of the chamber 14. As is known, the salts and particulates 76 may flow down the side walls 16 as a result of scraping of the walls. As the salts and particulates 76 are received by the brine 72, the composition of the brine 72 changes. In order to maintain the temperature and water content of the brine 72, the vessel 12 is provided with a quench inlet 78. Specifically, the quench inlet 78 is positioned below the surface level 74 of the brine 72 to allow the introduction of quench fluid 80 (shown in FIG. 1) to the pool of brine 72. As seen in FIG. 1, the quench fluid 80 is stored in a holding tank 82 that is in fluid communication with the quench inlet 78 via line 84. Also connected to line 84 is a neutralizing agent 86 stored in a holding tank 88. The neutralizing agent 86 may be added to the quench fluid 80 in order to control and manipulate the content of the pool of brine 72. It may be desirable to quench the brine 72 for a number of reasons, including to dissolve the salts and particulates 76, to adjust the pH of the brine 72, and/or to allow the use of the brine 72 outside the reactor vessel 12. If desired, the quench fluid 80 may be water 42 from holding tank 44. In such cases, line 84 may be connected to holding tank 44. Preferably a high pressure pump (not shown) is utilized to draw the water 42 from the holding tank 44 to the quench inlet 78.

It will be appreciated that water from an external source, or relatively dirty water (e.g., sea water), or cool, recycled brine can be used as a quenching medium. These options would help to reduce the system's need for clean quench water. Additionally, it should be appreciated that the cooling fluid should be relatively cool when compared to the brine to provide the quenching medium. Stated another way, the cooling fluid need only be cooler than the brine to cool the brine.

Referring back to FIG. 2, the vessel 12 is shown having a brine outlet 90. Brine outlet 90 allows the brine 72, and the salts and particulates 76 therein, to be selectively removed from the vessel 12. Also shown in FIG. 2 is a fluid effluent discharge pipe 92 which is formed with a lumen 94. Although in FIG. 2, the discharge pipe 92 is shown affixed to the end 20 of the vessel 12 and oriented to extend through the brine 72, the discharge pipe 92 need not be so designed. Specifically, the discharge pipe 92 may pass through the side wall 16 of the vessel 12, either above or below the surface level 74 of the brine 72. Regardless of the specific design of the discharge pipe 92, the internal end 96 of the discharge pipe 92 is positioned inside the chamber 14, below the port 58, and above the surface level 74 of the brine 72, preferably in the plug flow section 70. The external end 98 is positioned outside the chamber 14. With this cooperation of structure, the discharge pipe 92 provides for removal of relatively clean, high temperature, high pressure fluid effluent 100 from the chamber 14 through the lumen 94. As further shown in FIG. 2, the internal end 96 of the discharge pipe 92 may include a structure 102 that forces the fluid effluent to change direction prior to entering the discharge pipe 92 as indicated by arrows 104. Also shown are baffles 106 for reducing entrainment of salts and particulates at the internal end 96 of the discharge pipe 92.

Referring now to FIG. 1, it is seen that line 108 is in fluid communication with the external end 98 of the discharge pipe 92 (shown in FIG. 2). As shown, line 108 leads to an energy recovery unit 110, such as an engine or a turbine. The energy recovery unit 110 is able to recover energy from the 3400 psia, 1200° F. fluid effluent 100 without encountering the salts and precipitates 76 created during oxidization. The recovered energy can be used to power the air compressor 52 or other components in the system 10. In some embodiments, the heat of the fluid effluent 100 may be recovered by a heat recovery unit 112 which is also connected to line 108. As further shown in FIG. 1, brine outlet 90 is connected to a line 114 which leads to a heat recovery unit 116. With this arrangement, heat may be recovered from the brine 72 after it is discharged through the brine outlet 90.

While the particular system and method as herein shown and described in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for oxidizing a feed material which includes at least one reactant and water, under conditions wherein the temperature is within a range from above approximately 374° C. to approximately 800° C. and the pressure is above approximately 25 bar, said system comprising:
    a hollow, generally cylindrical-shaped reactor vessel creating an enclosed chamber and extending between a first end and a second end;
    a port at the first end of said reactor vessel for introducing the feed material into the chamber where the feed material is oxidized to create salts and particulates from the reactant, together with a fluid effluent;
    a means in fluid communication with the chamber to selectively introduce a quench fluid into said reactor vessel to maintain a brine pool therein for collecting the salts and particulates;
    a means in fluid communication with the brine pool to selectively remove salts and particulates therein from the chamber;
    a fluid effluent discharge pipe formed with a lumen, wherein said discharge pipe is affixed to said vessel, with an internal end thereof positioned inside the chamber and an external end thereof positioned outside the vessel for removal of the fluid effluent from the chamber through the lumen; and
    a means for reducing salt and particulate entrainment, the reducing means being positioned proximate the fluid effluent discharge pipe, wherein the reducing means includes baffles.

2. A system as recited in claim 1 further comprising a means for recovering energy from the fluid effluent, the energy recovering means being connected to the external end of the fluid effluent discharge pipe.

3. A system as recited in claim 2 wherein the energy recovering means includes a turbine.

4. A system as recited in claim 2 wherein the energy recovering means includes an engine.

5. A system as recited in claim 2 further comprising a means for recovering heat from the fluid effluent, the heat recovery means being positioned between the external end of the fluid effluent discharge pipe and the energy recovering means.

6. A system as recited in claim 2 wherein the selectively removing means removes a volume of brine from the brine pool, and the system further comprises a means for recovering heat from the brine.

7. A system as recited in claim 1 wherein the means for selectively introducing the quench fluid includes means for controlling the temperature of the brine pool and the brine concentration.

8. A system as recited in claim 7 wherein the quench fluid includes a neutralizing agent.

9. A system as recited in claim 1 wherein the chamber comprises:
    a back-mixing section positioned proximate the first end of the vessel;
    a jet assembly for jet mixing the feed material in the back-mixing section to initiate reaction of the feed material; and
    a plug flow section positioned between the back-mixing section and the brine pool for carrying out additional reaction.

10. A system for oxidizing a feed material which includes at least one reactant and water, under conditions wherein the temperature is within a range from above approximately 374° C. to approximately 800° C. and the pressure is above approximately 25 bar, said system comprising:
    a hollow, generally cylindrical-shaped reactor vessel creating an enclosed chamber and extending between a first end and a second end;
    a port at the first end of said reactor vessel for introducing the feed material into the chamber where the feed material is oxidized to create salts and particulates from the reactant, together with a fluid effluent;
    a quench inlet in fluid communication with the chamber to selectively introduce a quench fluid into said reactor vessel to maintain a brine pool therein for collecting the salts and particulates;
    a brine outlet in fluid communication with the brine pool to selectively remove salts and particulates therein from the chamber;
    a fluid effluent discharge pipe formed with a lumen, wherein said discharge pipe is affixed to said vessel, with an internal end thereof positioned inside the chamber and an external end thereof positioned outside the vessel for removal of the fluid effluent from the chamber through the lumen; and
    a means for reducing salt and particulate entrainment, the reducing means being positioned proximate the fluid effluent discharge pipe, wherein the reducing means includes baffles.

11. A system as recited in claim 10 wherein the chamber comprises:
    a back-mixing section positioned proximate the first end of the vessel;
    a jet assembly for jet mixing the feed material in the back-mixing section to initiate reaction of the feed material; and
    a plug flow section positioned between the back-mixing section and the brine pool for carrying out additional reaction.

* * * * *